Patented Jan. 6, 1931 1,787,467

UNITED STATES PATENT OFFICE

WILLIAM A. BENDER AND ROBERT DOUGLAS, OF ROCHESTER, AND LOWELL H. CUTHBERT, OF FAIRPORT, NEW YORK, ASSIGNORS, BY MESNE ASSIGNMENTS, TO GENERAL FOODS CORPORATION, OF NEW YORK, N. Y., A CORPORATION OF DELAWARE

PROCESS AND MEDIUM FOR DECOLORIZING AND DEFLAVORING COLLOIDAL SOLUTIONS

No Drawing.   Application filed August 19, 1925.   Serial No. 51,268.

Our invention relates to the decolorizing and deflavoring of colloidal solutions, especially pectin solutions.

To these and other ends the invention resides in certain improvements and combinations of parts, all as will be hereinafter more fully described, the novel features being pointed out in the claims at the end of the specification.

Colloidal solutions, particularly those intended for food or medicinal purposes often contain objectionable color and flavor, which it is necessary to remove without removing the colloid itself.

Carbons of decolorizing and deflavoring properties, so-called activated carbons, have been used to remove objectionable color and flavor.

In the treatment of colloidal solutions, particularly pectin solutions, we have found it impracticable to decolorize and deflavor, using powdered carbons in the known ways, which are:

1. Forcing the liquor by suction through a layer of carbon contained in an open tub or by pressure through a layer contained in a closed tower, then removing the entrained carbon by further filtration; and 2. Stirring the required amount of the carbon directly into the liquor, allowing it to settle after the action is complete, then removing the carbon which remains suspended by filtration in the known manner, as through a filter press with or without a filter aid such as diatomaceous earth. These known methods are impracticable because of the peculiar properties of pectin or colloidal solutions: In case (1) the carbon layer quickly packs tight and becomes impermeable to the liquor at ordinary pressures and causes ultrafiltration (i. e. the colloidal itself is filtered out) with very high pressures; in case (2) it is impossible to remove the large amount of suspended carbon even with a filter press and using filter aids, because the filter medium quickly clogs causing low rate of filtration, high pressure and ultrafiltration, and the filtrate is not clear. The colloid particles attract unto themselves fine carbon particles which carry through into the filtrate. The small amount of filtrate that is obtained is contaminated with an extremely fine suspension of carbon particles, causing a very objectionable gray turbidity or "smoke" which cannot be removed.

We have discovered that by first mixing the carbon with a fibrous material like sulphite pulp and then forming a layer of this mixture in a suitable vessel, colloidal solutions, and pectin solutions in particular, can be readily percolated through such mixture, eliminating the aforementioned difficulties. The carbon exerts its decolorizing and deflavoring properties; so that a deflavored and decolorized pectin solution is obtained, containing only a minimum amount of extremely fine carbon particles which are easily removed by filtration as described herein below.

The fibrous pulp holds the carbon particles in situ or place when mixed with the powdered carbon, thus forming a medium which prevents the carrying through of excessive carbon or "smoke" into the solution, and which is readily permeable to colloidal solutions, such as pectin solutions, holding back nearly all the fine carbon from contaminating the solution, allowing the carbon to come into intimate contact with said solution and yet preventing the carbon from packing so tight as to cause stoppage of the percolation.

The mixture is very conveniently employed in a percolator consisting of a shallow vertical cylindrical tank with a cloth covered, perforated or gridded false bottom, with a juice outlet at the bottom of the tank, connected to a pig tail loop to maintain a constant suction on the mixture of carbon and pulp.

The sulphite paper used for this mixture is of the quality ordinarily used for filtration and is commercially available as rolls of dry heavy paper. This is soaked in water and broken up in any convenient form of pulper; so that no hard lumps are present, but not so fine as would be used for paper making. The carbon is then incorporated with the pulp. The intimate carbon pulp mixture is then transferred or pumped onto the percolator false bottom, which is first filled with water to the level of the cloth, building up the desired layer of the mixture. The outlet valve is then opened and the surplus water drawn off but without sucking in any air through the mixture and under the cloth. The valve is then closed and the liquor is started over the mass. When the mass is covered, the outlet valve is opened to a point determined by experience. The liquor then slowly percolates through the mass and is decolorized and deflavored in its passage through the mass. Liquor is continually supplied on top of the percolator to take the place of that run off below. A series of such percolators can be used, each one being cut out in turn as it becomes spent. Such percolators we have found very suitable and effective for the decolorizing and deflavoring of pectin solutions. On the other hand such percolators are not designed to remove a fine suspension of mechanical impurities which will clog the mixture and stop the percolation.

We have also discovered that there is an optimum percentage mixture of paper pulp and carbon which permits a satisfactory and economical rate of percolation. If the percentage of paper is increased or decreased to any notable extent above or below the optimum figure, the rate of percolation becomes so small as to be uneconomical and impracticable. This optimum figure is easily determined by trial for varying qualities and finenesses of carbon used.

There is also an upper limit to the amount of this optimum mixture that can be used on a percolator of a given size to get the best results. If this limit is greatly exceeded, the mixture quickly packs hard and becomes practically impermeable to the liquor.

For example, we have employed a mixture of sulphite pulp with an activated carbon of lignite origin of the following general screen analysis: approximately 50% of the carbon was retained on a 100 mesh sieve while approximately 50% passed through the 100 mesh sieve. The optimum range for paper, using these materials, is 25 to 30% of the of the total mixture on the air dry basis. The percentages of paper that are so far out of this range as to be impracticable are 20% and 38%. A satisfactory economical amount to use on a percolating tub, 6 feet in diameter, is 37½ pounds of such carbon and 12½ pounds sulphite pulp, both on the air-dry basis.

Our mixture of carbon and fibrous medium, in the preferred form herein described, thus has a plastic spongy open porous character and may be used for example, in a thickness of from two to four inches under a suction head of six to eight feet, being applied to the supporting surface such as the false bottom of the percolator in its original wet state. Our mixture is not a paper and if dried, would not form a sheet but on the contrary would at once fall to pieces. Besides pectin solutions, other colloidal solutions, such as gelatin and agar-agar, can be readily percolated through our medium.

Pectin solutions containing approximately 1% actual pectin can be satisfactorily percolated through such carbon and pulp mixture or composition. As the pectin content decreases the viscosity of the solution decreases, and the percolator proceeds more rapidly than with high concentrations of pectin.

The amount of "smoke" or finely-divided carbon in the pectin solution after percolation through the above-described mixture is very small and is readily removed by filtering through an ordinary tub filter, using ordinary filtermass as the filter medium or through a filter press using a filter aid such as diatomaceous earth. By the term "filter mass" is meant a fibrous material, such as cellulose or sulphite pulp, used in filtering operations. This term excludes carbon, sand, fuller's earth and like materials.

Increasing the temperature lowers viscosity and hastens filtration. We have found a temperature of about 120° Fahrenheit very satisfactory for percolating pectin solutions through the carbon-pulp filter.

We claim as our invention:

1. The process of decolorizing and deflavoring colloidal solutions comprising percolating the same through a mixture or medium of activated carbon and filter mass, the medium being of a coarse open texture and containing 50% or more of carbon, by weight, air-dry basis.

2. The process of decolorizing and deflavoring colloidal solutions comprising percolating the same through a layer of a plastic, spongy, porous mass formed by a mixture of activated carbon and a fibrous material.

3. The process of decolorizing and deflavoring colloidal solutions comprising the step of percolating the same through a layer of a spongy, porous mass formed by a mixture of a major portion of activated carbon and a minor portion of a fibrous material.

4. The process of decolorizing and deflavoring colloidal solutions comprising percolating the same through a mixture or medium of activated carbon and sulphite pulp, the medium being of a coarse open texture and containing 50% or more of carbon, by weight, air-dry basis.

5. The process of decolorizing and deflavoring pectin solutions comprising percolating the same through a mixture or medium of activated carbon and filter mass, the medium being of a coarse open texture and containing 50% or more of carbon by weight, air-dry basis.

6. The process of decolorizing and deflavoring pectin solutions comprising percolating the same through a mixture or medium of activated carbon and sulphite pulp, the medium being of a coarse open texture and containing 50% or more of carbon, by weight, air-dry basis.

7. The process of decolorizing and deflavoring colloidal solutions comprising percolating the same through a uniform plastic mixture of activated carbon and sulphite pulp in optimum proportions, said mixture being distributed in a layer on a foraminous support, substantially as described.

8. The process of decolorizing and deflavoring colloidal solutions comprising the steps of forming a wet mixture of activated carbon and a fibrous material, depositing said mixture in a layer in its original wet state and percolating the solution therethrough.

9. The process of decolorizing and deflavoring colloidal solutions comprising the steps of forming a wet mixture of activated carbon and a fibrous material in which the weight of carbon exceeds that of said fibrous material, depositing the said mixture in its original wet state in a layer on a foraminous support and percolating the said solution therethrough.

10. A percolating medium for colloidal solutions comprising an intimate, spongy, porous mixture of activated carbon and a lesser quantity of a fibrous material.

WILLIAM A. BENDER.
ROBERT DOUGLAS.
LOWELL H. CUTHBERT.